US012027137B2

(12) United States Patent
Lin et al.

(10) Patent No.: US 12,027,137 B2
(45) Date of Patent: Jul. 2, 2024

(54) DISPLAY APPARATUS AND METHOD FOR PREVENTING IMAGE BURN-IN THEREOF

(71) Applicant: GIGA-BYTE TECHNOLOGY CO., LTD., New Taipei (TW)

(72) Inventors: Cheng-Lung Lin, New Taipei (TW); Chih-Cheng Huang, New Taipei (TW); Tzu-Yi Tsao, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 17/824,267

(22) Filed: May 25, 2022

(65) Prior Publication Data

US 2023/0197036 A1 Jun. 22, 2023

(30) Foreign Application Priority Data

Dec. 22, 2021 (TW) ................................ 110148049

(51) Int. Cl.
*G09G 5/10* (2006.01)

(52) U.S. Cl.
CPC ......... *G09G 5/10* (2013.01); *G09G 2320/046* (2013.01); *G09G 2320/0626* (2013.01); *G09G 2360/16* (2013.01)

(58) Field of Classification Search
None
See application file for complete search history.

(56) References Cited

U.S. PATENT DOCUMENTS

| | | | | |
|---|---|---|---|---|
| 9,693,003 | B1 * | 6/2017 | Vassigh | H04N 21/4854 |
| 2010/0060554 | A1 | 3/2010 | Koh et al. | |
| 2013/0257884 | A1 * | 10/2013 | Koh | G09G 3/3208 345/545 |
| 2018/0204498 | A1 | 7/2018 | Yang et al. | |

(Continued)

FOREIGN PATENT DOCUMENTS

| | | | |
|---|---|---|---|
| CN | 107665665 | A | 2/2018 |
| JP | 2001-13914 | A | 1/2001 |
| JP | 2014-126698 | A | 7/2014 |

OTHER PUBLICATIONS

Taiwanese Office Action and Search Report for Taiwanese Application No. 110148049, dated Aug. 12, 2022.

(Continued)

*Primary Examiner* — Andre L Matthews
(74) *Attorney, Agent, or Firm* — Birch, Stewart, Kolasch & Birch, LLP

(57) ABSTRACT

A display apparatus is provided, which includes a display panel and a display controller. The display controller calculates an image average brightness of each image in a video signal from a host. When an absolute difference between a first image average brightness of a current image and a second image average brightness of a previous image is smaller than a predetermined value, the display controller activates a timer to obtain a timer value. When the timer value reaches a first duration, the display controller reduces brightness of each pixel in the current image by a first ratio. When the timer value reaches a second duration, the display controller reduces the brightness of each pixel in the current image by a second ratio. The second duration is longer than the first duration, and the second ratio is higher than the first ratio.

8 Claims, 4 Drawing Sheets

(56) References Cited

U.S. PATENT DOCUMENTS

| | | | |
|---|---|---|---|
| 2018/0204538 | A1 | 7/2018 | Yang et al. |
| 2021/0035498 | A1 | 2/2021 | Chang |

OTHER PUBLICATIONS

Extended European Search Report for European Application No. 22177039.9, dated Oct. 17, 2022.
Japanese Office Action for Japanese Application No. 2022-185677, dated Oct. 3, 2023, with English translation.

* cited by examiner

DISPLAY APPARATUS AND METHOD FOR PREVENTING IMAGE BURN-IN THEREOF

CROSS REFERENCE TO RELATED APPLICATIONS

This Application claims priority of Taiwan Patent Application No. 110148049, filed on Dec. 22, 2021, the entirety of which is incorporated by reference herein.

BACKGROUND OF THE INVENTION

Field of the Invention

The invention relates to display apparatuses, and, in particular, to an electronic device and a method for preventing image burn-in thereof.

Description of the Related Art

Due to advancements in technology, computer users spend more and more time using monitors every day. In some applications, the host will play a static image on a display panel at a high brightness level for a long time, which can easily cause the pixel components of the display panel to age, resulting in image burn-in. This is especially problematic with organic light-emitting diode (OLED) panels.

BRIEF SUMMARY OF THE INVENTION

In view of the above, an electronic device and a method for preventing image burn-in thereof are provided to solve the aforementioned problem.

In an exemplary embodiment, a display apparatus is provided, which includes a display panel and a display controller. The display controller is configured to receive a video signal from a host, and to display the video signal on the display panel. The display controller calculates an image average brightness of each image in the video signal. In response to an absolute difference between a first image average brightness of a current image in the video signal and a second image average brightness of a previous image in the video signal being smaller than a predetermined value, the display controller activates a timer to obtain a timer value. In response to the timer value reaching a first duration, the display controller reduces brightness of each pixel in the current image of the video signal displayed on the display panel by a first ratio. In response to the timer value reaching a second duration, the display controller reduces the brightness of each pixel in the current image of the video signal displayed on the display panel by a second ratio. The second duration is longer than the first duration, and the second ratio is higher than the first ratio.

In some embodiments, in response to the timer value is greater than or equal to a third duration, the display controller reduces the brightness of each pixel in the current image of the video signal displayed on the display panel to 0, wherein the third duration is longer than the second duration.

In some embodiments, the display controller calculates an average value of a red sub-pixel, a green sub-pixel, and a blue sub-pixel of each pixel in each image of the video signal, calculates a sum of the average values of all pixels in each image, and divides the calculated sum by a resolution of the display panel to obtain the image average brightness of each image.

In some embodiments, in response to the absolute difference being smaller than the predetermined value, the display controller determines that the current image and the previous image are substantially the same.

In some embodiments, in response to the absolute difference being greater than or equal to the predetermined value, the display controller determines that the current image and the previous image are different images, and resets the timer value of the timer.

In some embodiments, the display controller further dynamically adjusts the predetermined value according to the image average brightness of the current image.

In some embodiments, when the image average brightness of the current image is in a first brightness interval, the display controller sets the predetermined value to a first predetermined value. When the image average brightness of the current image is in a second brightness interval, the display controller sets the predetermined value to a second predetermined value. When the image average brightness of the current image is in a third brightness interval, the display controller sets the predetermined value to a third predetermined value. The first brightness interval is higher than the second brightness interval, and the second brightness interval is higher than the third brightness interval. The first predetermined value is greater than the second predetermined value, and the second predetermined value is greater than the third predetermined value.

In another exemplary embodiment, a method for preventing image burn-in for use in a display apparatus is provided. The display apparatus includes a display panel and a display controller. The method includes the following steps: utilizing the display controller to receive a video signal from a host, and displaying the video signal on the display panel; utilizing the display controller to calculate an image average brightness of each image in the video signal; in response to an absolute difference between a first image average brightness of a current image in the video signal and a second image average brightness of a previous image in the video signal being smaller than a predetermined value, utilizing the display controller to activate a timer to obtain a timer value; in response to the timer value reaching a first duration, utilizing the display controller to reduce brightness of each pixel in the current image of the video signal displayed on the display panel by a first ratio; in response to the timer value reaching a second duration, utilizing the display controller to reduce the brightness of each pixel in the current image of the video signal displayed on the display panel by a second ratio. The second duration is longer than the first duration. The second ratio is higher than the first ratio.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
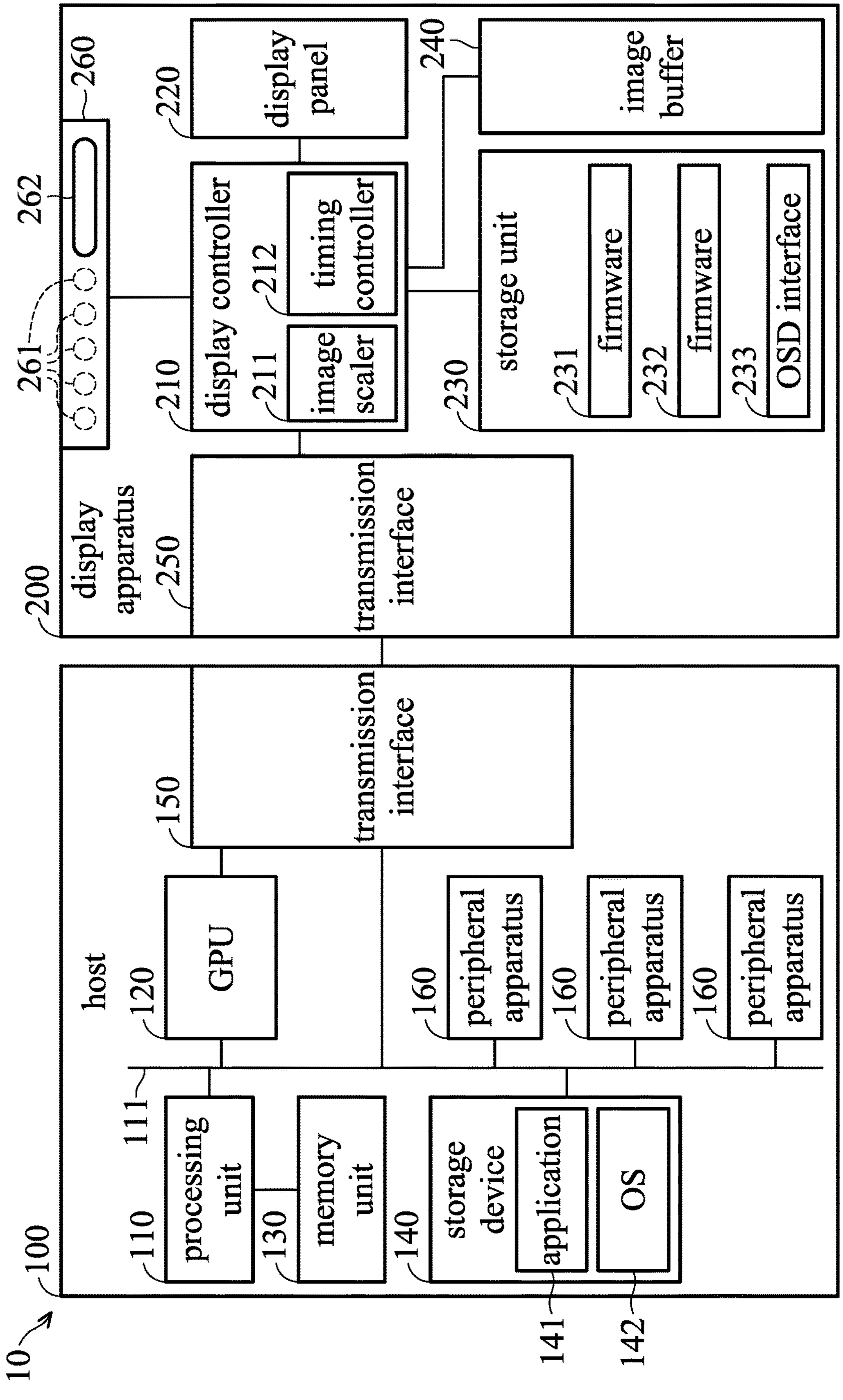
FIG. 1 is a block diagram of a computer system in accordance with an embodiment of the invention.

FIG. 1 is a block diagram of a computer system in accordance with an embodiment of the invention. The computer system 10, for example, may be a personal computer or server equipped with a display apparatus. As illustrated in FIG. 1, the computer system 10 includes a host 100 and a display apparatus 200, wherein the host 100 has a signal connection to the display apparatus 200. For example, the host 100 may include a processing unit 110, a graphics processing unit (GPU) 120, a memory unit 130, a storage device 140, one or more transmission interfaces 150, and one or more peripheral apparatuses 160. The processing unit 110, graphics processing unit 120, memory unit 130, storage device 140, transmission interfaces 150, and peripheral apparatuses 160 may be coupled to each other via the system bus 111. The processing unit 110, for example, may be a central processing unit (CPU), a general-purpose processor, etc., but the invention is not limited thereto. The graphics processing unit 120, for example, may be a graphics processing unit on a video adapter or integrated into the processing unit 110.

The memory unit 130 may be a random access memory such as a static random access memory (SRAM) or a dynamic random access memory (DRAM), but the invention is not limited thereto. The storage device 140 may be a non-volatile memory such as a hard-disk drive, a solid-state disk (SSD), a flash memory, or a read-only memory (ROM), but the invention is not limited thereto.

The transmission interface 150 may include wired transmission interfaces and/or wireless transmission interfaces. The wired transmission interfaces may include: high definition multimedia interface (HDMI), DisplayPort (DP) interface, embedded DisplayPort (eDP) interface, Universal Serial Bus (USB) interface, USB Type-C interface, Thunderbolt interface, digital video interface (DVI), video graphics array (VGA) interface, general purpose input/output (GPIO) interface, universal asynchronous receiver/transmitter (UART) interface, serial peripheral interface (SPI), inter-integrated circuit (I2C) interface, or a combination thereof. The wireless transmission interfaces may include Bluetooth, WiFi, near-field communication (NFC) interface, etc., but the invention is not limited thereto. The peripheral apparatus 160, for example, may include input apparatuses such as a keyboard, a mouse, a touch pad, etc., but the invention is not limited thereto.

For example, the storage device 140 may store one or more applications 141 and an operating system 142 (e.g., Windows, Linux, MacOS, etc.). The processing unit 110 may load the operating system 142 and the applications 141 to the memory unit 130 for execution. The graphics processing unit 120 may, for example, perform graphics processing on the application being executed by the processing unit 110 to generate an image signal that includes one or more images, and transmit the image signal to the display apparatus 200 via the transmission interfaces 150 and 250 (e.g., HDMI or DisplayPort interface).

The display apparatus 200, for example, may be a flat panel display, a television, a projector, or a computer monitor, but the invention is not limited thereto. The display apparatus 200 includes a display controller 210, a display panel 220, a storage unit 230, an image buffer 240, one or more transmission interface 250, and an input interface 260.

The transmission interface 250 may include wired transmission interfaces and/or wireless transmission interfaces. The wired transmission interfaces may include: high definition multimedia interface (HDMI), DisplayPort (DP) interface, embedded DisplayPort (eDP) interface, Universal Serial Bus (USB) interface, USB Type-C interface, Thunderbolt interface, digital video interface (DVI), video graphics array (VGA) interface, general purpose input/output (GPIO) interface, universal asynchronous receiver/transmitter (UART) interface, serial peripheral interface (SPI), inter-integrated circuit (I2C) interface, or a combination thereof. The wireless transmission interfaces may include Bluetooth, WiFi, near-field communication (NFC) interface, etc., but the invention is not limited thereto. The peripheral apparatus 160, for example, may include input apparatuses such as a keyboard, a mouse, a touch pad, etc., but the invention is not limited thereto.

The display controller 210, for example, may be implemented by an application-specific integrated circuit (ASIC), a system-on-chip (SoC), a processor, or a microcontroller, but the invention is not limited thereto.

The display panel 220, for example, may be a liquid-crystal display panel, a light-emitting diode (LED) panel, or an organic light-emitting diode (OLED) panel, but the invention is not limited to the three aforementioned types of display panels.

The storage unit 230, for example, may be a non-volatile memory such as a read-only memory (ROM), an erasable programmable read-only memory (EPROM), an electrically erasable programmable read-only memory (EEPROM), etc., but the invention is not limited thereto. The storage unit 230 is configured to store firmware 231 and 232 associated with the display apparatus 200, and one or more on-screen-display (OSD) interface 233. The storage unit 230 may be disposed outside the display controller 210, or alternatively integrated into the display controller 210.

The firmware 231, for example, may include extended display identification data (EDID) and display settings of the display apparatus 200, and one or more on-screen-display (OSD) interfaces 233. The EDID, for example, may include information such as the manufacturer, product name, resolution, frames per second (FPS) of the display apparatus 200. The display settings of the display apparatus 200 may include the brightness, contrast, sharpness, color temperature of the display apparatus 200. The firmware 232 may include instructions or program codes of the function of image burn-in prevention of the display apparatus 200.

In an embodiment, the display controller 210 may read the firmware 231 and 232 and program code of the OSD interface 233 stored in the storage unit 230 via a bus (e.g., an I2C bus), and configure the corresponding display parameters. In addition, the display controller 210 may transmit the EDID of the display apparatus 200 to the host 100 via one of the transmission interfaces 250 (e.g., may be an image-transmission channel or a data-transmission channel), so that the processing unit 110 and the graphics processing unit 120 in the host 100 may configure the resolution and corresponding synchronization signals of the output image signal based on the EDID. The OSD interfaces 233, for example, may include an OSD menu and corresponding options, an information dashboard, a timer, a counter, a crosshair, a specific symbol, a specific color, a specific text, or a combination thereof, but the invention is not limited thereto.

The image buffer 240, for example, may be a volatile memory (e.g., a DRAM) or a non-volatile memory (e.g., a flash memory), that is configured to store output images to be displayed on the display panel 220, wherein the host 100 or the display controller 210 may, according to an OSD enable signal generated by the host 100, overwrite a specific region of the image signal stored in the image buffer 240 with the one or more OSD interfaces 232.

The input interface 260 is configured to control the OSD menu of the display apparatus 200. The input interface 260 may be implemented by one or more physical buttons 261 or a five-way joystick 262 to implement instructions such as up, down, left, right, and confirm.

In an embodiment, when the user performs an operation in one direction of the five-way joystick 262 (or presses one of the physical buttons 261), the display controller 210 may read the firmware 231 and the program code or firmware of the OSD menu and corresponding options of the OSD interfaces 233 from the storage unit 230, and display the OSD menu and corresponding options on the display panel 220. In an embodiment, the user may perform operations on the input interface 260 to control the OSD menu of the display apparatus to adjust the brightness, contrast, sharpness, color temperature, or activate or deactivate other interfaces among the OSD interfaces 233. In another embodiment, the activating and deactivating of the OSD interfaces 233 and the content displayed on the OSD interface 233, for example, can be controlled by the peripheral apparatus 160 of the host 100, where the details will be described later.

For example, the firmware 231 can be regarded as the default firmware of the display apparatus 200, and the user may control the settings of the OSD interface 233 displayed on the display apparatus 200 via the five-way joystick 262 (or the physical buttons 261).

In an embodiment, the display controller 210 may include an image scalar 211 and a timing controller 212. The display controller 210 may receive the image signal from the host 100 and/or another signal from other hosts via one of the transmission interfaces 250, and the image scalar 211 may perform an image-scaling process and/or image-overlaying process on the received image signals to fit the resolution of the display panel 220, and store the images (e.g., output images) generated by the image-scaling process to the image buffer 240. The timing controller 212 may control the display panel 220 to read the output images from the image buffer 240 for displaying.

In another embodiment, the display controller 210 may include the timing controller 212, and the resolution of the image signal from the host 100 may fit that of the display panel 220. Thus, the display controller 210 may directly store the received image signal from the host 100 to the image buffer 240 without performing the image-scaling process. The timing controller 212 may read the output images stored in the image buffer 240, and control the display panel 220 to display the output images.

FIGS. 2A-2D are diagrams showing reduced screen brightness in accordance with an embodiment of the invention. Please refer to FIG. 1 and FIGS. 2A-2D.

In an embodiment, the display controller 210 may calculate a number of pixels with changes between a current image (e.g., time N) and a previous image (e.g., time N−1) of the video signal. For example, when the absolute value of the brightness difference of a specific pixel at the same location of the current image (e.g., time N) and the previous image (e.g., time N−1) is greater than 0 (or greater than a preset value), the display controller 210 may determine that there is change of the specific pixel. In some embodiments, the brightness difference is a difference value between the grey levels of the specific pixel. In some other embodiments, the brightness difference may be a sum of differences of red sub-pixels, green sub-pixels, and blue sub-pixels of the specific pixel, but the invention is not limited thereto.

Figure 2A:
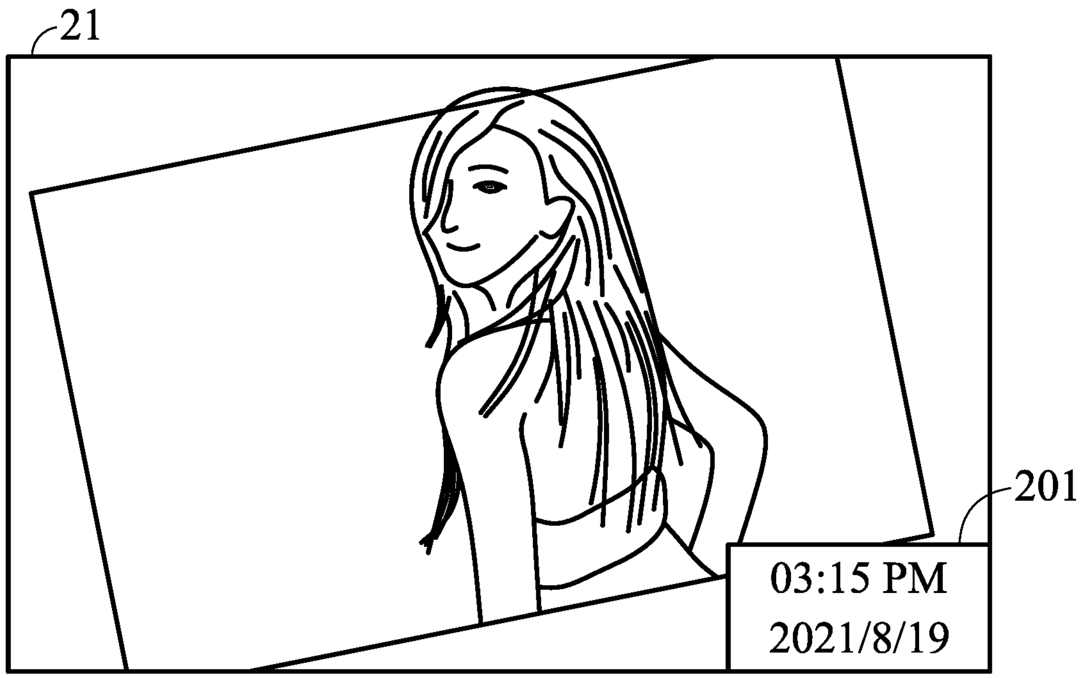
FIGS. 2A-2D are diagrams showing reduced brightness of the screen in accordance with an embodiment of the invention.
Figure 2B:
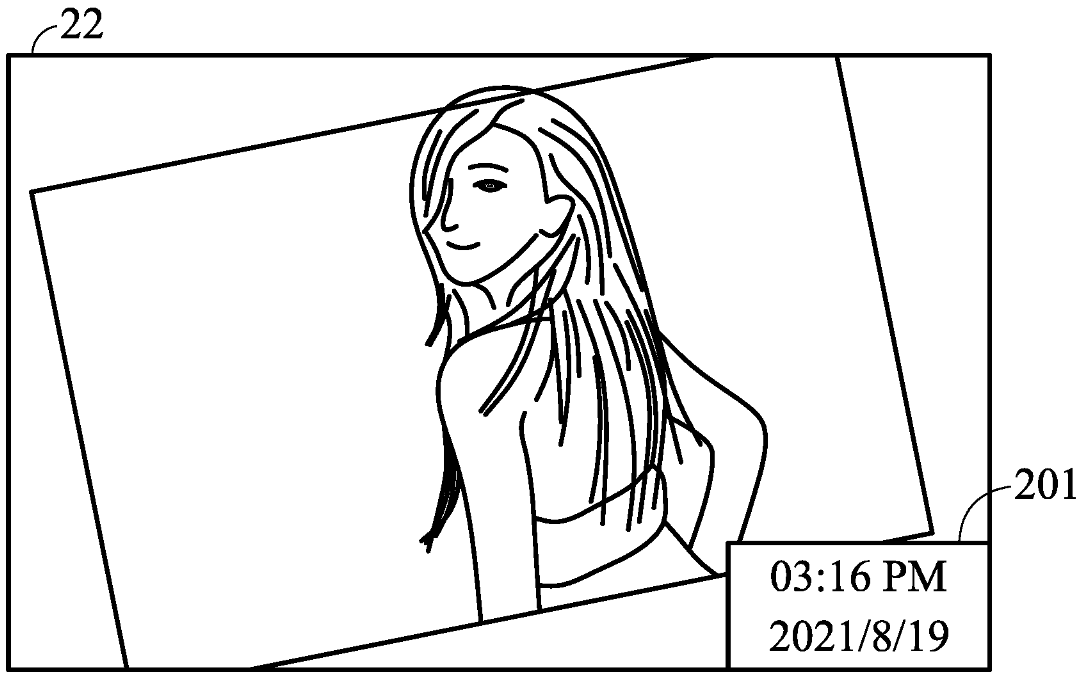

For example, as shown in FIG. 2A, the video signal transmitted from the host 100 to the display apparatus 200 includes image 21 which is a static image, and image 21 includes a time toolbar 201, and its current time is 3:15 PM. In addition, the host 100 may periodically update the time displayed in the time toolbar 201, such as once every minute. Accordingly, at 3:16 PM, the video signal transmitted from the host 100 to the display apparatus 200 may include image 22, as shown in FIG. 2B.

Assuming that the display panel 220 plays 60 frames per second, image 21 will be maintained for one minute (i.e., 60 frames), and image 22 will also be maintained for one minute (i.e., 60 frames). The display controller 210 calculate the average brightness Y of all pixels in each image in the video signal, as shown in equation (1):

$$Y = \frac{1}{M}\sum_{K=1}^{M} K \cdot Z \tag{1}$$

wherein M denotes the resolution of the display panel 220; K denotes a single pixel; Z denotes the average brightness value of the red sub-pixel, green sub-pixel, and blue sub-pixel in the single pixel. For example, if the resolution of the display panel 220 is 1920×1080, M=1920×1080=2073600 pixels. If the brightness of the red sub-pixel, green sub-pixel, and blue sub-pixel in a single pixel are respectively represented by BR, BG, and BB, Z=(BR+BG+BB)/3.

The display controller 210 then calculates the picture average brightness $Y_N$ and $Y_{N-1}$ of the current image (i.e., time N) and the previous image (i.e., time N−1), and calculates the absolute difference A between the picture average brightness $Y_N$ and $Y_{N-1}$, where the absolute difference A can be expressed by equation (2):

$$A = |Y_N - Y_{N-1}| \tag{2}$$

When the absolute difference A is between 0 and a predetermined value TH (e.g., 1, but not limited), it indicates that the picture average brightness $Y_N$ and $Y_{N-1}$ of the current image (i.e., time N) and the previous image (i.e., time N−1) are very close, so the display controller 210 determines that the current image (i.e., time N) and the previous image (i.e., time N−1) are substantially the same two images. At this time, if the timer (not shown in FIG. 1) is not activated, the display controller 210 activates the timer to calculate the duration of the static image. If the time has been activated, the display controller 210 will continue to accumulate the time value of the timer.

It should be noted that if the aforementioned absolute difference A is greater than or equal to the predetermined value TH, it indicates that a large change occurs between the picture average brightness $Y_N$ and $Y_{N-1}$ of the current image (i.e., time N) and the previous image (i.e., time N−1), so that display controller 210 determines that the current image (i.e., time N) and the previous image (i.e., time N−1) are different images, and resets the time value of timer. In this embodiment, the display controller uses a fixed predetermined value TH to determine whether the current image and the previous image are substantially the same image.

Since image 21 in FIG. 2A and image 22 in FIG. 2B are static images and the different between images 21 and 22 is only the time displayed by the time toolbar 201, the mechanism performed by the display controller 210 for determining whether the current image and the previous image are substantially the same image already includes a tolerance value, which can allow for small changes in the screen, such as the time jump on the time toolbar 201, or the flickering cursor on the text editor.

Figure 2C:
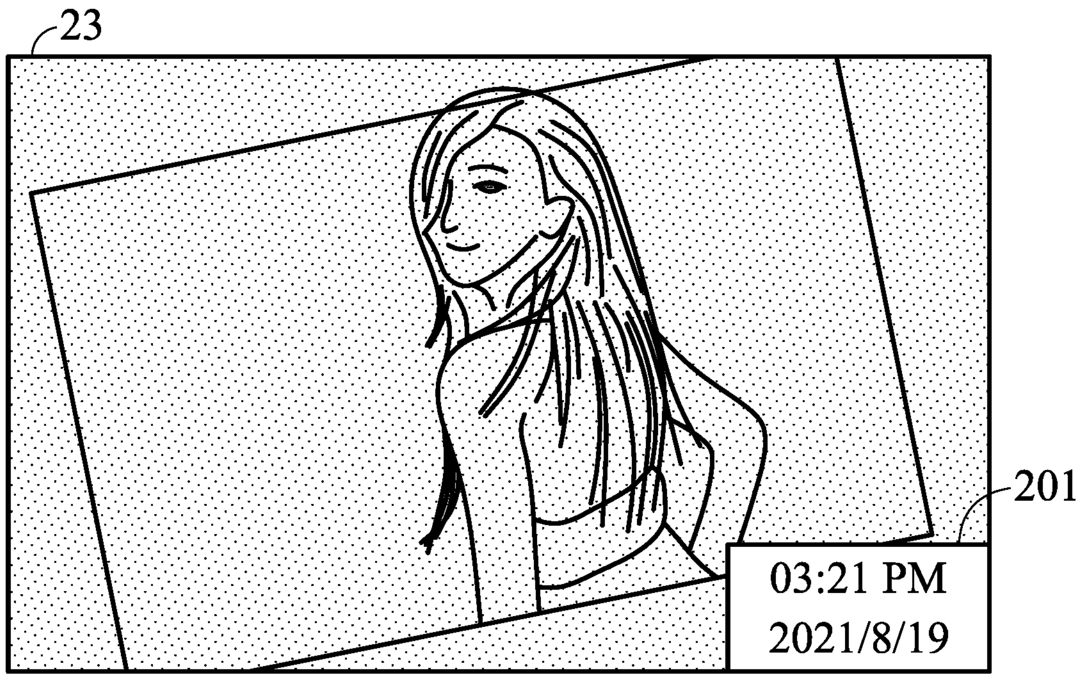

Specifically, when the time value of the timer has reached the first duration, it indicates that the video signal displayed on the display apparatus 200 has maintained a static image for a period of time, so the display controller 210 activates the mechanism for preventing screen burn-in of the display apparatus 200, and reduce the brightness of each pixel of the current image in the video signal displayed by the display panel 220 by a first ratio. For example, the first duration is 5 minutes, and the first ratio is 50%, but the invention is not limited thereto. For example, image 22 in FIG. 2B at 3:16 PM starts to remain static. At 3:21 PM, the display controller 210 will determine that the time value of the timer has reached the first duration (e.g., 5 minutes), so the display controller 210 will reduce the brightness of each pixel in the current image of the video signal displayed on the display panel 220 by 50%, as shown in FIG. 2C.

Figure 2D:
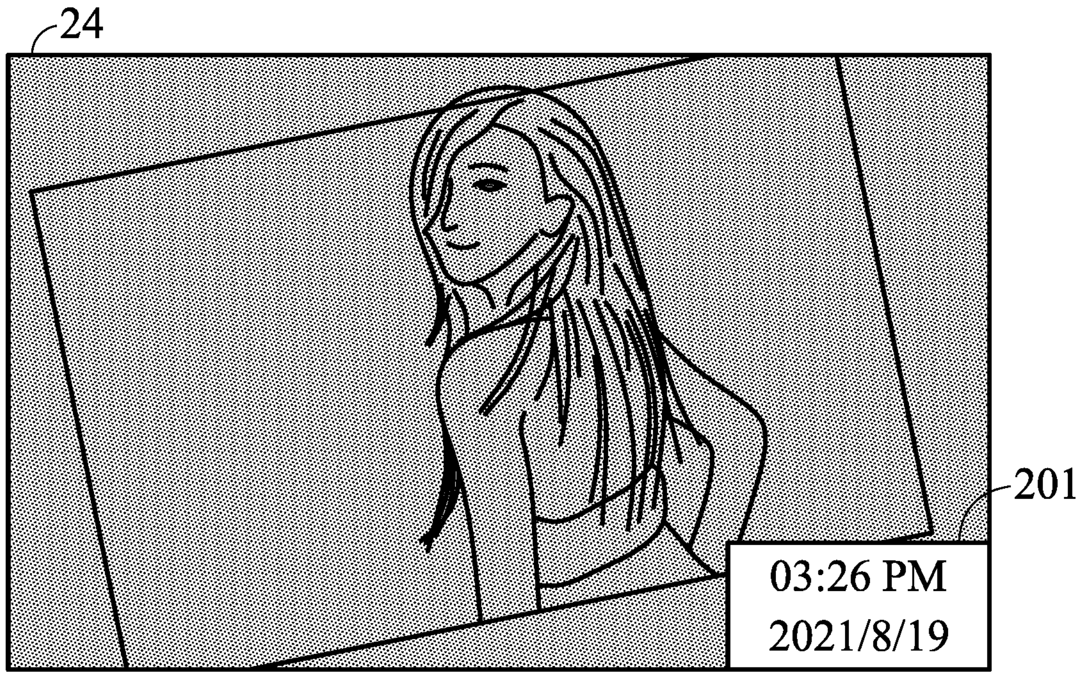

Then, because the video signal from the host 100 still maintains a static image, when the timer value has reached the second duration (e.g., 10 minutes), it indicates that the video signal displayed on the display apparatus 200 has continued to maintain at the static image for a longer time, and the display controller 210 may reduce the brightness of each pixel in the current image of the video signal displayed on the display apparatus 200 by a second ratio, where the second duration may be 10 minutes, and the second ratio may be 70%, but the invention is not limited thereto. For example, image 22 in FIG. 2B starts to remain static at 3:16 PM. At 3:26 PM, the display controller 210 may determine that the timer value of the timer has reached the second duration (e.g., 10 minutes), and the display controller 210 may reduce the brightness of each pixel in the current image of the video signal displayed on the display panel 220 by 70%, as shown in FIG. 2D.

Because the video signal from the host 100 still maintains static, when the timer value of the timer has reached a third duration (e.g., 15 minutes), it indicates that the video signal displayed on the display apparatus 200 has continued to remain static for a very long time, and the display controller 210 may reduce the brightness of each pixel in the current image of the video signal displayed on the display apparatus 200 to 0 (e.g., a black screen is displayed), where the third duration may be 15 minutes, but the invention is not limited thereto. In addition, the display controller 210 may read the OSD interface 233 corresponding to a notification message from the firmware 231 and display the notification message on the display panel 220 to notify the user that the display apparatus 200 has entered the screen anti-burn-in mode.

In another embodiment, the display controller 210 may dynamically adjusts the predetermined value TH according to the average brightness of the current image of the video signal, thereby determining whether the current image and the previous image are substantially the same image. For example, when the average brightness of the current image of the video signal is between 100% and 70% (e.g., the first brightness interval) of the highest brightness (e.g., 255) of each pixel, the display controller 210 may set the aforementioned predetermined value TH to a predetermined value TH1, where the predetermined value TH1 is, for example, 0.00005. This means that when the average brightness of the current image is at a high brightness, the display controller 210 can set a lower predetermined value TH1 (i.e., tolerance ratio) to determine whether the current image and the previous image are substantially the same image.

When the average brightness of the current image of the video signal is between 70% and 30% (e.g., the second brightness interval) of the highest brightness (e.g., 255) of each pixel, the display controller 210 may set the predetermined value TH to a predetermined value TH2, where the predetermined value TH2 is, for example, 0.0001. This means that when the average brightness of the current image is at medium brightness, the display controller 210 may set a moderate predetermined value TH2 (i.e., a tolerance ratio) to determine whether the current image and the previous image are substantially the same image.

When the average brightness of the current image of the video signal is between 30% and 10% (e.g., the third brightness interval) of the highest brightness (e.g., 255) of each pixel, the display controller 210 may set the predetermined value TH to a predetermined value TH3, wherein the predetermined value TH3 is, for example, 0.0002). This means that when the average brightness of the current image is low, the display controller 210 may set a higher predetermined value TH3 (i.e., tolerance ratio) to determine whether the current image and the previous image are substantially the same image.

Figure 3:
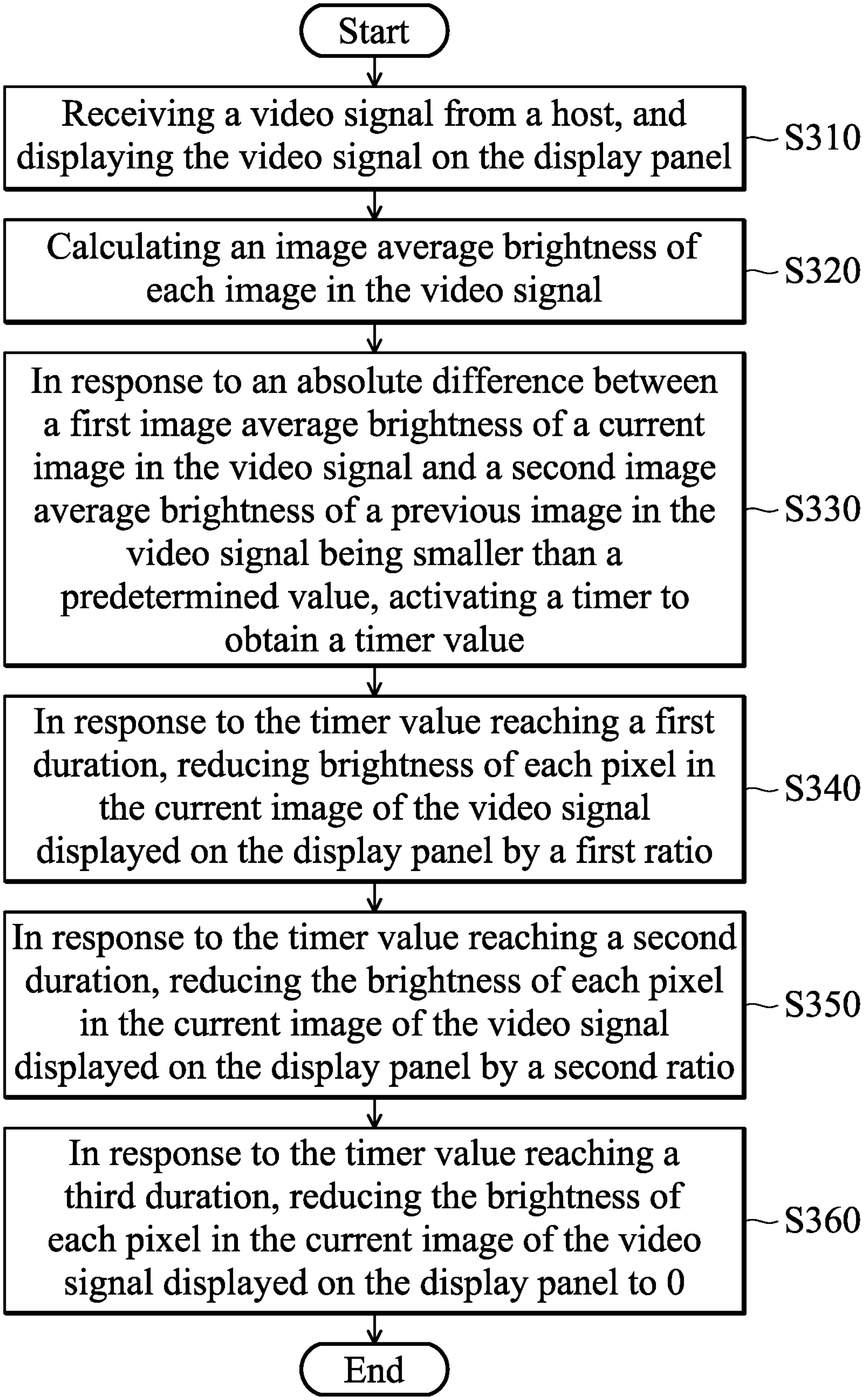
FIG. 3 is a flow chart of a method for preventing image burn-in in accordance with an embodiment of the invention.

FIG. 3 is a flow chart of a method for preventing image burn-in in accordance with an embodiment of the invention. Please refer to FIG. 1 and FIG. 3.

In step S310, the display controller 210 receives a video signal from the host 100 and displays the video signal on the display panel 220.

In step S320, the display controller 210 calculates the average brightness of each image in the video signal. For example, the display controller 210 may calculate the average brightness value Z of the red sub-pixel, green sub-pixel, and blue sub-pixel of each pixel in each image of the video signal, and calculate the sum of the average brightness values of all pixels in each image, and divide the calculated sum by the resolution (i.e., the total number of pixels) of the display panel 220 to obtain the average brightness Y of each image, as shown in equation (1).

In step S330, when the absolute value between a first image average brightness of the current image and a second image average brightness of the previous image in the video signal is smaller than a predetermined value, the display controller 210 may activate the timer to obtain the timer value. For example, the image average brightness values of the current image (i.e., time N) and the previous image (i.e., time N−1) are respectively $Y_N$ and $Y_{N-1}$, and the absolute difference A is shown in equation (2). When the absolute difference A is between 0 and a predetermined value TH (e.g., 1, but not limited), it indicates that the picture average brightness $Y_N$ and $Y_{N1}$ of the current image (i.e., time N) and the previous image (i.e., time N−1) are very close, so the display controller 210 determines that the current image (i.e., time N) and the previous image (i.e., time N−1) are substantially the same two images.

In step S340, when the timer value has reached a first duration, the display controller 210 reduces the brightness of each pixel in the current image of the video signal displayed on the display panel 220 by a first ratio.

In step S350, when the timer value has reached a second duration, the display controller 210 reduces the brightness of each pixel in the current image of the video signal displayed on the display panel 220 by a second ratio, wherein the second duration is longer than the first duration, and the second ratio is higher than the first ratio.

In step S360, when the timer value has reached a third duration (e.g., greater than or equal to the third duration), the display controller 210 reduces the brightness of each pixel in the current image of the video signal displayed on the display panel 220 to 0, where the third duration is longer than the second duration. For example, when the absolute difference A is between 0 and a predetermined value TH (e.g., 1, but not limited), it indicates that the picture average brightness $Y_N$ and $Y_{N1}$ of the current image (i.e., time N) and the previous image (i.e., time N−1) are very close, so the display controller 210 determines that the current image (i.e., time N) and the previous image (i.e., time N−1) are substantially the same two images. At this time, if the timer (not shown in FIG. 1) is not activated, the display controller 210 activates the timer to calculate the duration of the static image. If the time has been activated, the display controller 210 will continue to accumulate the time value of the timer. If the aforementioned absolute difference A is greater than or equal to the predetermined value TH, it indicates that a large change occurs between the picture average brightness $Y_N$ and $Y_{N-1}$ of the current image (i.e., time N) and the previous image (i.e., time N−1), so that display controller 210 determines that the current image (i.e., time N) and the previous image (i.e., time N−1) are different images, and resets the time value of timer.

In view of the above, a display apparatus and a method for preventing screen burn-in thereof are provided, which are capable determining whether the current image and the previous image in the video signal from the host are substantially the same, and determining the duration of the same image. When determining that the video image is a static image, the display apparatus can accumulate the timer value, and further reduce the brightness of each pixel in the current pixel of the video signal according to the timer value, thereby reducing the overall brightness of the display panel when displaying the static image. Therefore, the probability of burn-in phenomenon occurring on the display panel can be reduced.

The use of terms such as “first”, “second”, and “third” in claims is used to modify elements in the claims, and is not used to indicate that there is a priority order, antecedent relationship, or Is an element preceded by another element, or a chronological order when performing a method step, only used to distinguish elements with the same name.

While the invention has been described by way of example and in terms of the preferred embodiments, it should be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A display apparatus, comprising:

a display panel; and a display controller, configured to receive a video signal from a host, and display the video signal on the display panel;

wherein the display controller calculates an image average brightness of each image in the video signal, wherein in response to an absolute difference between a first image average brightness of a current image in the video signal and a second image average brightness of a previous image in the video signal being smaller than a predetermined value, the display controller activates a timer to obtain a timer value, wherein in response to the timer value reaching a first duration, the display controller reduces brightness of each pixel in the current image of the video signal displayed on the display panel by a first ratio, wherein in response to the timer value reaching a second duration, the display controller reduces the brightness of each pixel in the current image of the video signal displayed on the display panel by a second ratio, wherein the second duration is longer than the first duration, and the second ratio is higher than the first ratio, wherein in response to the timer value being greater than or equal to a third duration, the display controller displays a black screen on the display panel, wherein the third duration is longer than the second duration, wherein the display controller further dynamically adjusts the predetermined value according to the image average brightness of the current image, wherein when the image average brightness of the current image is in a first brightness interval, the display controller sets the predetermined value to a first predetermined value, wherein when the image average brightness of the current image is in a second brightness interval, the display controller sets the predetermined value to a second predetermined value, wherein when the image average brightness of the current image is in a third brightness interval, the display controller sets the predetermined value to a third predetermined value, wherein the first brightness interval is higher than the second brightness interval, and the second brightness interval is higher than the third brightness interval, wherein the first predetermined value is greater than the second predetermined value, and the second predetermined value is greater than the third predetermined value.

2. The display apparatus as claimed in claim 1, wherein the display controller calculates an average value of a red sub-pixel, a green sub-pixel, and a blue sub-pixel of each pixel in each image of the video signal, calculates a sum of the average values of all pixels in each image, and divides the calculated sum by a resolution of the display panel to obtain the image average brightness of each image.

3. The display apparatus as claimed in claim 1, wherein in response to the absolute difference being smaller than the predetermined value, the display controller determines that the current image and the previous image are substantially the same.

4. The display apparatus as claimed in claim 1, wherein in response to the absolute difference being greater than or equal to the predetermined value, the display controller determines that the current image and the previous image are different images, and resets the timer value of the timer.

5. A method for preventing image burn-in, for use in a display apparatus, wherein the display apparatus comprises a display panel and a display controller, the method comprising:

utilizing the display controller to receive a video signal from a host, and displaying the video signal on the display panel;

utilizing the display controller to calculate an image average brightness of each image in the video signal;

in response to an absolute difference between a first image average brightness of a current image in the video signal and a second image average brightness of a previous image in the video signal being smaller than a predetermined value, utilizing the display controller to activate a timer to obtain a timer value;

in response to the timer value reaching a first duration, utilizing the display controller to reduce brightness of each pixel in the current image of the video signal displayed on the display panel by a first ratio;

in response to the timer value reaching a second duration, utilizing the display controller to reduce the brightness of each pixel in the current image of the video signal displayed on the display panel by a second ratio, wherein the second duration is longer than the first duration, and the second ratio is higher than the first ratio; and utilizing the display controller to dynamically adjust the predetermined value according to the image average brightness of the current image, wherein in response to the timer value being greater than or equal to a third duration, utilizing the display controller to display a black screen on the display panel, wherein the third duration is longer than the second duration, wherein the step of utilizing the display controller to dynamically adjust the predetermined value according to the image average brightness of the current image comprises:

when the image average brightness of the current image is in a first brightness interval, utilizing the display controller to set the predetermined value to a first predetermined value;

when the image average brightness of the current image is in a second brightness interval, utilizing the display controller to set the predetermined value to a second predetermined value; and when the image average brightness of the current image is in a third brightness interval, utilizing the display controller to set the predetermined value to a third predetermined value, wherein the first brightness interval is higher than the second brightness interval, and the second brightness interval is higher than the third brightness interval, wherein the first predetermined value is greater than the second predetermined value, and the second predetermined value is greater than the third predetermined value.

6. The method as claimed in claim 5, wherein the step of utilizing the display controller to calculate an image average brightness of each image in the video signal comprises:

utilizing the display controller to calculate an average value of a red sub-pixel, a green sub-pixel, and a blue sub-pixel of each pixel in each image of the video signal, to calculate a sum of the average values of all pixels in each image, and to divide the calculated sum by a resolution of the display panel to obtain the image average brightness of each image.

7. The method as claimed in claim 5, further comprising: in response to the absolute difference being smaller than the predetermined value, utilizing the display controller to determine that the current image and the previous image are substantially the same.

8. The method as claimed in claim 5, further comprising: in response to the absolute difference being greater than or equal to the predetermined value, utilizing the display controller to determine that the current image and the previous image are different images, and to reset the timer value of the timer.

* * * * *